United States Patent [19]

Butler

[11] 4,310,797
[45] Jan. 12, 1982

[54] STUD DETECTOR USING A MAGNETICALLY ACTUATED SWITCH WITH MAGNETIC BIASING

[76] Inventor: Richard A. Butler, 6334 St. John's Dr., Eden Prairie, Minn. 55344

[21] Appl. No.: 50,878

[22] Filed: Jun. 21, 1979

Related U.S. Application Data

[63] Continuation-in-part of Ser. No. 944,244, Sep. 21, 1978, abandoned.

[51] Int. Cl.³ .................... G01N 27/72; G01R 33/12; H01H 9/00
[52] U.S. Cl. ................................. 324/228; 324/262; 335/205
[58] Field of Search ................. 324/228, 262; 335/205

[56] References Cited

U.S. PATENT DOCUMENTS

| | | |
|---|---|---|
| 2,749,663 | 5/1956 | Lemelson .......................... 324/228 |
| 2,762,970 | 9/1956 | Balduman . |
| 2,843,821 | 7/1958 | Gottlieb . |
| 3,002,149 | 10/1961 | Christian . |
| 3,487,346 | 12/1969 | Gardel et al. . |
| 3,665,511 | 5/1972 | Wolf . |
| 3,714,563 | 1/1973 | Voll . |
| 3,882,374 | 5/1975 | McDaniel . |
| 4,099,118 | 7/1978 | Franklin et al. . |

OTHER PUBLICATIONS

Advertisement of Mitchell Safety Supply Co. of Phila. Pa., "Locates Any Metal Object Wires, Pipes, Reinforcing Steel Inside Walls & Plaster".
Instruction Sheet of Alarm Device Manufacturing Co. of L.I., N.Y. "How to Install the #56 Recessed Magnetic Contact".

*Primary Examiner*—Gerard R. Strecker
*Assistant Examiner*—Walter E. Snow
*Attorney, Agent, or Firm*—Kinney, Lange, Braddock, Westman and Fairbairn

[57] ABSTRACT

The stud detector apparatus of the present invention automatically indicates the presence of nails and other ferrous fasteners beneath a wall covering, thus revealing the presence of a wall stud or ceiling joist. The apparatus includes a magnetic actuated switch, a power source, and a light source conductively connected in series. The magnetic actuated switch has a substantially planar wall engaging surface, first and second terminals, and a movable magnet. The movable magnet is normally in a position in which the current path between the terminals is open. When the wall engaging surface is held near a ferrous substance, the movable magnet moves to a position which allows current to flow between the first and second terminals. In use, the wall engaging surface of the apparatus is held near and moved parallel to the surface of the wall. The presence of a nail or other ferrous fastener is indicated when the light source is energized.

16 Claims, 12 Drawing Figures

STUD DETECTOR USING A MAGNETICALLY ACTUATED SWITCH WITH MAGNETIC BIASING

REFERENCE TO CO-PENDING APPLICATION

The present application is a continuation-in-part of my co-pending U.S. Patent application, Ser. No. 944,244, filed Sept. 21, 1978, now abandoned.

BACKGROUND OF THE INVENTION

The present invention relates to an apparatus used to detect studs by detecting the nails or other ferrous type fasteners that hold a wall covering such as gypsum board to a wall stud or ceiling joist. In particular, the present invention employs the use of a magnetic actuated switch which turns on a light when the apparatus is close to such a ferrous fastener.

Once a wall has been painted or covered by some sheet type wall covering such as wall paper, the studs are difficult if not impossible to locate without damaging the wall. The location of such studs is important in properly hanging heavy objects such as mirrors or shelves.

Some devices in the prior art that have been used to locate studs have been sophisticated metal detectors. These devices are too expensive for the average homeowner to buy for the sole purpose of detecting wall studs. The inexpensive devices of the prior art consist of a magnetic rod that is allowed to freely rotate on a pivot. This type of device is difficult to use in that it has to be moved slowly across a wall in a horizontal position for the rod to "point" at a nail. This type of device must be viewed from above, thus precluding any use of the device above eye level. Another disadvantage is that it cannot be used to locate ceiling joists since it has to be held in a horizontal position. Thus the location of a wall stud is a slow and tedious process using the devices of the prior art.

SUMMARY OF THE INVENTION

The stud detecting apparatus of the present invention overcomes the problems associated with the prior art devices. The present invention is simple in construction and low in cost. It can be moved rapidly across a wall surface and will indicate the position of any ferrous fastener that it moves over. Since the indicator of the present invention is a light and not a pointer, it may be used above eye level. It does not have to be held in a horizontal position; thus, ceiling joists may also be detected.

The stud detecting apparatus of the present invention includes magnetic actuated switch means, power source means, and light source means conductively connected in series. The magnetic actuated switch means includes a substantially planar wall engaging surface, first and second terminals, and movable magnet means which control current flow between the first and second terminals. The current path between the terminals is normally open and is closed when the wall engaging surface is held near a ferrous substance, thereby allowing current to flow between the first and second terminals and energizing the light source means.

In a preferred embodiment, the movable magnet means is movable within a compartment. Also positioned within the compartment are first and second electrical contacts, which are connected to the first and second terminals, respectively. The second contact is a leaf spring contact having a free end which is normally positioned near, but spaced from, the first electrical contact, so that current is not permitted to pass. When the movable magnet means moves toward the wall engaging surface due to the presence of a ferrous substance near the wall engaging surface, it causes the free end of the second leaf spring contact to make electrical contact with the first contact, thereby allowing current to pass between the first and second terminals. In this embodiment, the magnetic actuated switch means includes ferrous metal bias means. The magnetic attraction between the movable magnet means and the ferrous metal bias means normally biases the magnet means to a position away from the wall engaging surface, so that the free end of the leaf spring contact is spaced from the first contact, and the current path between the first and second terminals is open. Magnetic attraction between the magnet means and a ferrous substance proximate the wall engaging surface causes the movable magnet means to slide to a position proximate the wall engaging surface, thereby bringing the free end of the second leaf spring contact into contact with the first contact and closing the current path between the first and second terminals.

DETAILED DESCRIPTION OF THE PREFERRED EMBODIMENTS

Figure 1:
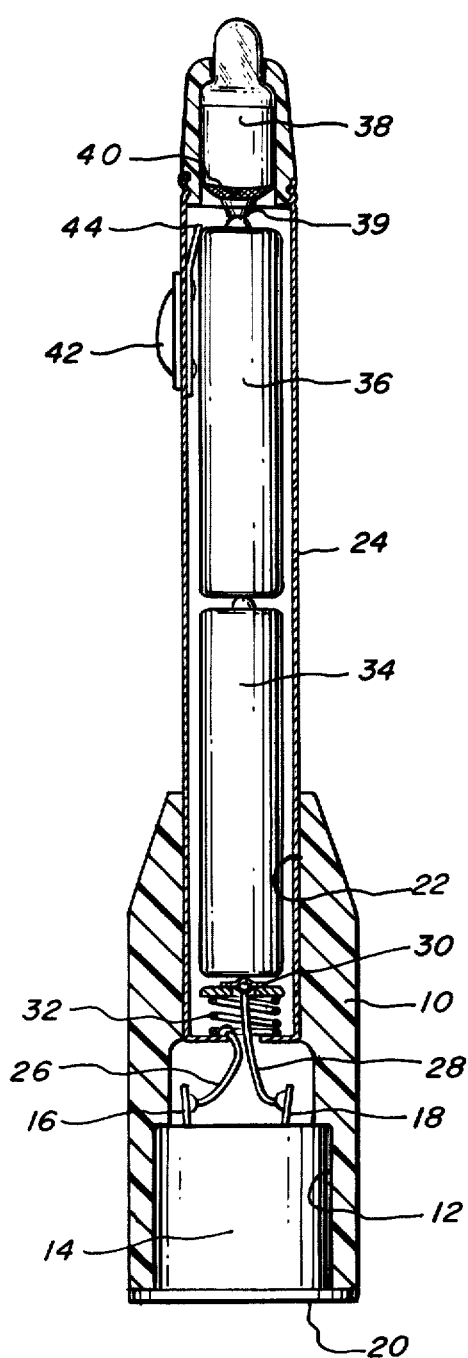
FIG. 1 is a cut-away view of one preferred embodiment of the stud detector apparatus of the present invention.

The Stud Detector Apparatus of FIG. 1

FIG. 1 shows one successful embodiment of the stud detector apparatus of the present invention. The apparatus includes a sleeve 10 made of a non-conducting material such as plastic having two different diameter receiving portions. The first receiving portion generally shown at 12 holds a magnetic actuated switch 14, which is press-fitted into first receiving portion 12.

Switch 14 is preferably of a commercially available type such as Ademco 56 made by Alarm Manufacturing Company. Switch 14 has two output terminals 16 and 18, a movable permanent magnet (not shown) and a bias spring (also not shown).

The movable magnet within switch 14 is arranged to slide in the direction normal to planar wall engaging surface 20. The bias spring applies a bias force which tends to hold the permanent magnet in a position which does not permit current flow between terminals 16 and 18. When switch 14 is placed near a ferrous metal object, such as a nail, the movable magnet moves toward planar surface 20 and completes the electrical circuit between terminals 16 and 18. Current is thereby permitted to pass between terminals 16 and 18. When switch 14 is moved away from the ferrous metal object, the bias spring urges the movable permanent magnet away from planar surface 20, thereby again opening the circuit between terminals 16 and 18.

In the preferred embodiment of the present invention, switch 14 is of a type that is sufficiently sensitive to detect the presence of nails located at depths of up to at least ⅜ inch beneath the wall surface. The planar surface 20 of switch 14 allows the user to conveniently slide the entire stud detector apparatus over a wall surface.

The second receiving portion shown generally at 22 holds an electrically conductive casing 24. Wire 26 runs through a hole in the bottom of casing 24 and is attached to casing 24 and terminal 16, thereby conductively connecting terminal 16 with casing 24. Wire 28 runs through the same hole as wire 26 and is attached to contact 30 and terminal 18, thereby conductively connecting contact 30 with terminal 18. Spring 32 is positioned between the casing 24 and contact 30, holding contact 30 against battery 34.

Batteries 34 and 36 are conductively connected in series by being physically one on top of each other, negative and positive terminals touching as shown. One successful embodiment of the present invention used two Eveready No. 912 (AAA) batteries for power. The present invention, however, is not confined to any particular type or combination of batteries, but includes all standard types of batteries commonly used to power such items as flashlights.

Light 38 sits atop and is conductively connected to the positive terminal of battery 36 by contact area 39. Light 38 is situated in such a position as to protrude beyond the casing 24 in order to provide a wide viewing angle of the light. The view of the light is at least a hemisphere field of vision enabling the user to observe light 38 from above or below eye level, as well as straight on.

On/off switch 42, when in its closed position, touches light 38 at contact area 40 with contact 44. This position completes the circuit since switch 42 is conductively connected to casing 24. The purpose of switch 42 in the open position is to provide a break in the circuit enabling the user of the apparatus to store it within a metal container without draining the batteries 34 and 36. When switch 42 is closed and the present invention is moved along a wall and encounters a nail, the magnet within switch 14 moves to a position which closes the current path between terminals 16 and 18 and completes the circuit, thereby energizing light 38. As soon as the stud detector passes the nail, the magnet returns to its normal position, the current path between terminals 16 and 18 opens, and light 38 turns off.

Figure 2:
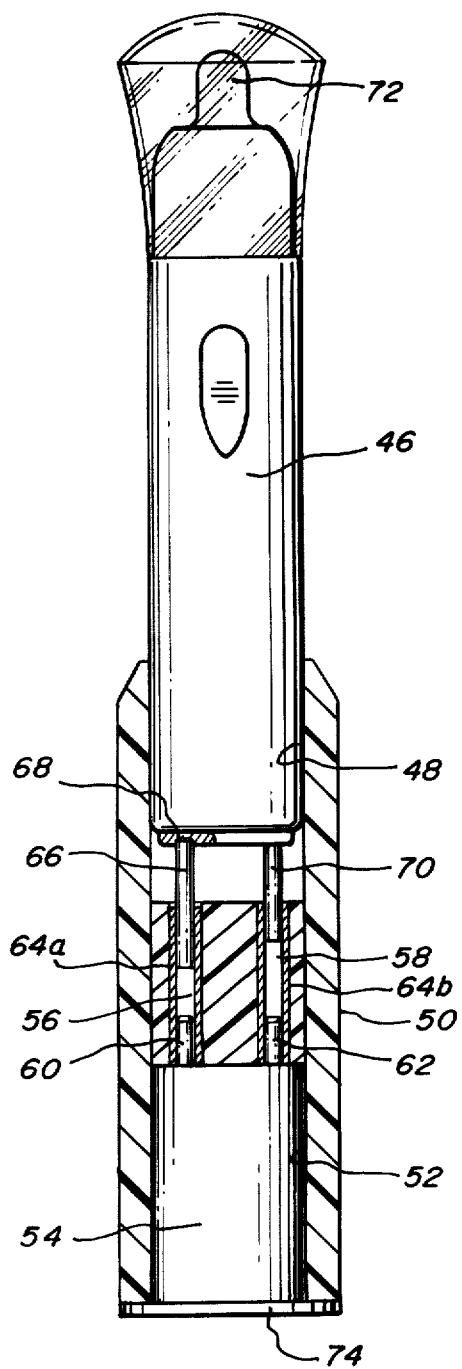
FIG. 2 is a partial cut-away view of another embodiment of the present invention.

The Stud Dectector Apparatus of FIG. 2

FIG. 2 illustrates another successful embodiment of the present invention whereby a flashlight 46 is fitted into a receiving portion generally shown at 48 of sleeve 50. Sleeve 50 is made of a suitable non-conducting material such as plastic and has a second receiving portion shown generally at 52 which holds a magnetic actuated switch 54 of the same type as described above. The two receiving portions 48 and 52 are connected by holes drilled in sleeve 50 shown generally at 56 and 58. The two terminals 60 and 62 of switch 54 engage with conductive sleeves 64a and 64b which line holes 56 and 58, respectively. Plug 66 is held within sleeve 64a and conductively connected thereto. The other end of plug 66 engages flashlight 46 through a hole 68 and is conductively connected to the bottom terminal of a battery (not shown) within flashlight 46. Plug 70 is permanently fixed and conductively connected to the casing of flashlight 46 and engages conductive sleeve 64b in hole 58. In this manner, switch 54 and flashlight 46 are conductively connected.

FIG. 2 also shows that light 72 may be viewed from at least a hemisphere field of vision even though the light is encased in a translucent protective wall. As in FIG. 1, the apparatus of FIG. 2 has a planar wall engaging surface 74 which allows the user to conveniently slide the entire apparatus over a wall surface.

The Stud Detector Apparatus of FIGS. 3–12

Although the stud detectors of FIG. 1 and FIG. 2 operate satisfactorily, further improvements are still possible. The device of FIGS. 3–12 illustrates a preferred embodiment of the present invention which is low cost, easy to manufacture and uses a unique and extremely simple magnetic actuated switch.

FIGS. 3–6 show various views of this preferred embodiment of the stud detector of the present invention. FIGS. 7–12 show various views of the electrical contacts of the magnetic actuated switch used in the stud detector of FIGS. 3–6.

As illustrated in FIGS. 3–6, the stud detector includes an outer shell 80, which preferably is molded plastic. The bottom cover 82 is attached to outer shell 80 at its bottom end, and forms the wall engaging surface of the stud detector. Like outer shell 80, bottom cover 82 is molded plastic.

Figure 3:
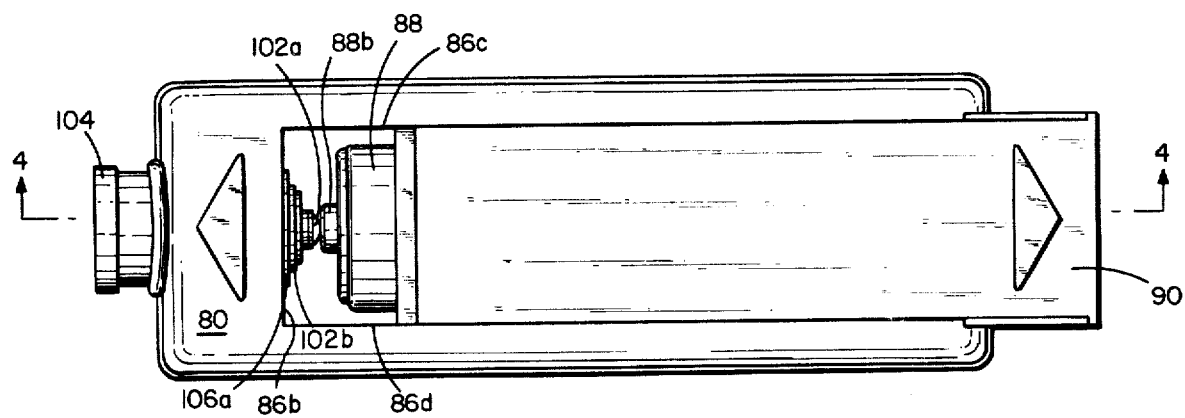
FIG. 3 is a top view of still another preferred embodiment of the present invention, with the top slide cover of the stud detector slightly open.

Positioned within the housing defined by outer shell 80 and bottom cover 82 is inner divider 84, which subdivides the interior of the housing into several compartments which hold the various components of the stud detector. Battery compartment 86 is in the upper portion of the interior of the housing. Battery 88, which is preferably a size AA battery is positioned within battery compartment 86. Slide cover 90 at the top of compartment 86 can be slid open to permit insertion and removal of battery 88. FIG. 3 shows slide cover 90 partially pulled out to expose a portion of battery 88.

Figure 4:
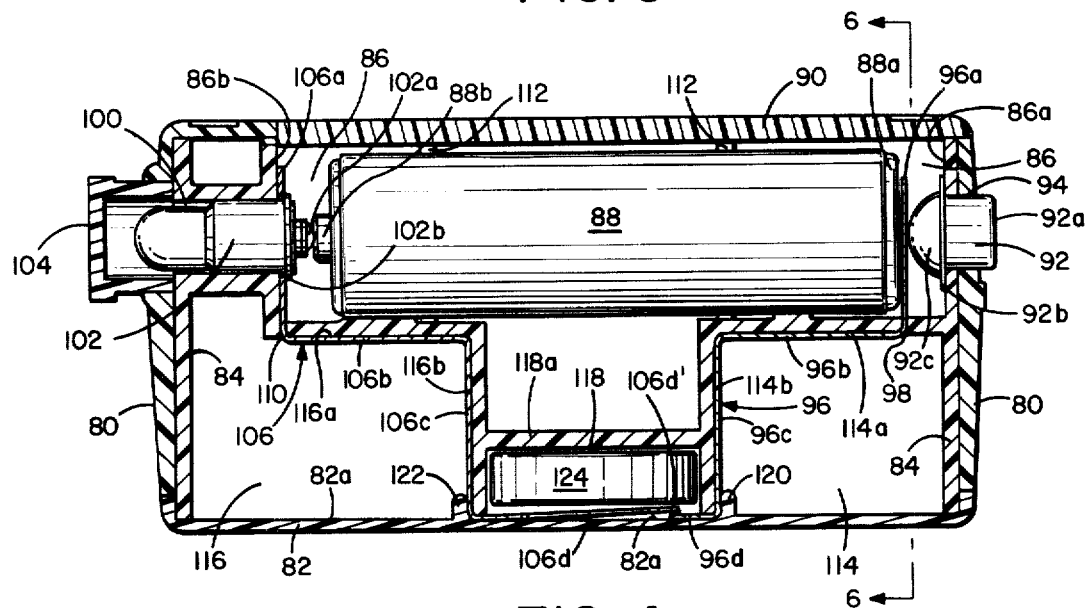
FIG. 4 is a sectional view along line 4—4 of FIG. 3, but with the top slide cover in closed position.
Figure 5:
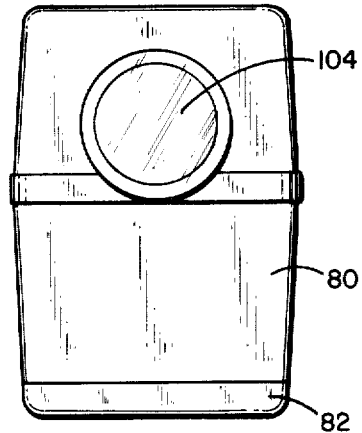
FIG. 5 is an end view of the stud detector of FIG. 3.
Figure 6:
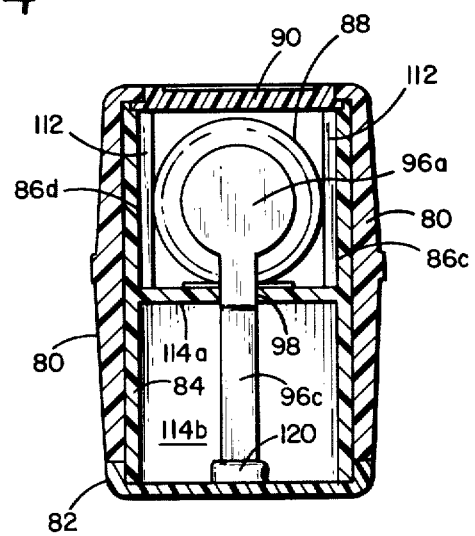
FIG. 6 is a sectional view along lines 6—6 of FIG. 4.

At one end of battery compartment 86, ON switch button 92 projects through hole 94 in outer shell 80 and inner divider 84. Button 92 has a first portion 92a which projects outside of the outer shell 80, a flange 92b which limits the outward movement of button 92, and a rounded portion 92c, which engages battery contact portion 96a of first terminal 96. As shown in FIGS. 4 and 6, battery contact portion 96a of first terminal 96 projects through hole 98 in inner divider 84 and acts as a leaf spring type contact. The spacing of hole 98, battery 88, and button 92 causes battery contact portion 96a to apply an outward force holding button 92 in its outermost position with flange 92b against the end wall 86a of battery compartment 86. In this position battery contact portion 96a is held out of contact with negative terminal 88a of battery 88. When the user presses button 92, button 92 applies force which overcomes the slight force of leaf spring portion 96a, and brings battery contact portion 96a into contact with negative terminal 88a of battery 88. In this position, the circuit is in its operation state.

At the opposite end of battery compartment 86, lamp compartment 100 holds a small incandescent lamp 102. In one preferred embodiment lamp 102 is a CM331 lamp bulb manufactured by Chicago Minature Lamp Works. Lamp compartment 100 communicates with the outside of the stud detector through holes in outer cover 80 and inner compartment 84. In the preferred embodiment shown in the Figures, lamp protector 104 covers the bulb end of lamp 102 to provide protection to bulb 102. In addition, protector 104 is preferably a translucent plastic material, and acts as a diffuser for the light produced by lamp 102. As a result, the light emitted by lamp 102 is more easily seen from a wide range of viewing angles.

Figure 8:
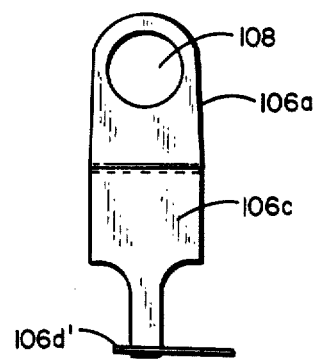

As best shown in FIG. 4, terminal 102a of lamp 102 contacts the positive terminal 88b of battery 88. Flange-type terminal 102b of lamp 102 is held in contact with lamp contact portion 106a of second terminal 106. As best shown in FIG. 8, upper end 106a of second terminal 106 has a hole 108 through which lamp 102 projects. As shown in FIG. 4, lamp contact portion 106a of second terminal 106 extends upward through hole 110 in inner divider 84 into battery compartment 86 along end wall 86b. Flange-type terminal 102b abuts against upper end 106a to provide electrical contact between lamp 102 and lamp contact portion 106a of second terminal 106.

To prevent excessive lateral movement of battery 88 within battery compartment 86, vertical ribs 112 are provided on opposite side walls 86c and 86d of battery compartment 86. Vertical ribs 112 are preferably an integral part of inner divider 84.

Bottom cover 82 and inner divider 84 define three additional compartments: first terminal compartment 114, second terminal compartment 116, and switch compartment 118. Horizontal portion 96b of first terminal 96 is connected at its one end to battery contact portion 96a and extends across top wall 114a of first terminal compartment 114. Vertical portion 96c of first terminal 96 is connected at one end of first terminal compartment 114 to horizontal portion 96b and extends downward along end wall 114b. Vertical portion 96c is held securely in position at its lower end between upstanding post or boss 120 and end wall 114b. First terminal 96 has a first switch contact portion 96d which is connected to the lower end of vertical portion 96c which extends a short distance into switch compartment 118 and lies in contact with the inner surface 82a of bottom cover 82.

Horizontal portion 106b of second terminal 106 is connected to lamp contact portion 106a and extends from hole 110 along top wall 116a of second terminal compartment 116. Vertical portion 106c is connected to horizontal portion 106b and extends downward along end wall 116b of terminal compartment 116. The lower end of vertical portion 106c is held securely between post or boss 122 and end wall 116b.

Figure 7:
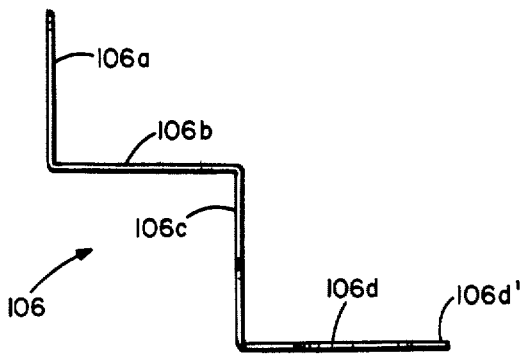
FIGS. 7, 8 and 9 are side, end and bottom views, respectively, of one contact of the magnetically actuated switch used in the stud detector of FIG. 3.
Figure 9:
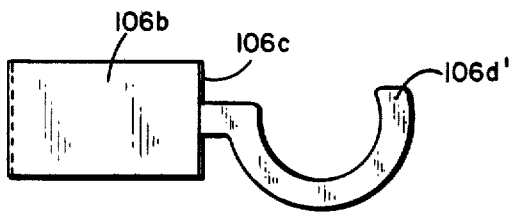

Second switch contact portion 106d of second terminal 106 is, as best shown in FIGS. 7-9, a sickle shaped leaf spring type contact which projects into switch compartment 118 and has its free end 106d' spaced slightly apart from contact 96d. In a preferred embodiment, sickle shaped contact portion 106d preferably forms an angle of about 89° with respect to portion 106c, and therefore forms an angle of approximately 1° with respect to inner surface 82a of bottom cover 82.

In the preferred embodiments of the present invention, magnet 124 is a cylindrical magnet having its magnet poles at its major surfaces. Magnet 124 is slidable within switch compartment 118, and is normally magnetically biased to a position near wall 118a of compartment 118, so that contacts 96d and 106d are spaced apart, and no electrical current can pass through the circuit formed by battery 88, lamp 102, and first and second terminals 96 and 106. This magnetic biasing is preferably achieved by the use of a steel case battery 88, such as an alkaline battery. Alternatively, other types of ferrous metal biasing means may be positioned on the opposite side of wall 118a from magnet 124 to attract magnet 124 toward wall 118a. The position and size of the ferrous metal biasing means is selected so that the magnetic attraction between magnet 124 and the ferrous metal biasing means permits magnet 124 to normally assume its bias position near wall 118a, despite the force of gravity which may pull magnet 124 toward front cover 82. The magnetic attraction between the biasing means and magnet 124, however, must be sufficiently weak so that when a ferrous material is placed near the wall engaging surface formed by bottom cover 82, magnet 124 will be attracted toward bottom cover 82, thereby physically pressing end 106d' into contact with first switch contact 96d. As soon as the ferrous metal is removed from its proximity with the wall engaging surface, magnet 124 returns to its bias position near rear wall 118a, and the leaf spring action of second switch contact 106d causes electrical contact between the first and second terminals to be broken.

It can be seen, therefore, that the magnetic actuated switch of the stud detector of FIGS. 3-6 is extremely simple and uses a minimum number of parts. Unlike prior art magnetic actuated switches, no spring bias is required. Instead, a magnetic bias is applied to the magnet. Similarly, contacts 96d and 106d within switch compartment 118 are simple, yet reliable.

Figure 12:
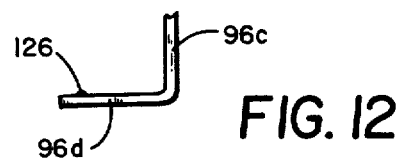
FIG. 12 is a detail view of the lower end of the contact shown in FIGS. 10 and 11.
Figure 11:
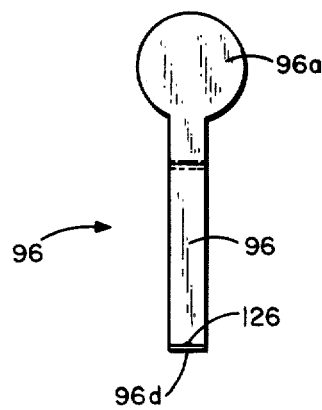
FIGS. 10 and 11 are side and end views, respectively, of the other contact of the magnetically actuated switch used in the stud detector of FIG. 3.
Figure 10:
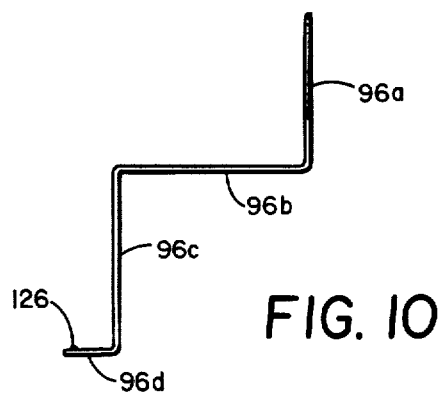

FIGS. 7-9 show second terminal 106, and FIGS. 10-12 show first terminal 96. In the preferred embodiment of the present invention, both terminal 96 and terminal 106 were stamped "half-hard" phosphor-bronze having a thickness of 0.006 inches.

As shown in FIGS. 7-9, free end 106d' of sickle shaped contact portion 106d has the highest elevation of all points on the sickle shaped portion. In one preferred embodiment, the width of the sickle shaped portion 106d was approximately 0.100 inch, the outer radius of the sickle shaped portion was about 0.300 inch and the inner radius was about 0.200 inch. Free end 106d' extended to the opposite side of the center line of terminal 106 from the rest of sickle shaped portion 106d by about 0.100 inch.

As shown in FIGS. 10-12, in a preferred embodiment of the present invention portion 96d of first terminal 96 preferably has a small dimple 126 on its upper surface. Dimple 126 is preferably about 0.005 inch in height and is spaced about 0.02 inch from the end of portion 96d. The purpose of dimple 126 is to provide a reliable contact with free end 106d' when magnet 124 forces them together. Free end 106d' merely needs to make contact with dimple 126 in order to provide electrical connection between first and second terminal 96 and 106. This point type of contact is a much more reliable and reproducible type connection than is made if the bottom surface of free end 106d' and the upper surface of first switch contact portion 96d must make a flush type of contact with one another.

In order to ensure that first switch contact portion 96d is held securely in the inner surface of bottom cover 82, the angle between portions 96c and 96d is preferably about 91°. The slight leaf spring action of first switch contact portion 96d, therefore, securely holds it in contact with the inner surface 82a of bottom cover 82, and as far away as possible from free end 106d'.

The magnetic actuated switch of the present invention is extremely simple, and uses a minimum number of parts, and can be produced by high production techniques, yet provides highly sensitive operation. While it is particularly useful in the stud detector of the present invention, it may be used for other magnetic switching applications as well.

Conclusion

From the above descriptions it is apparent that the present invention is a considerable improvement over prior devices in ease of operation and cost. The present invention satisfies need for an apparatus that easily and automatically detects studs and has a reasonable cost.

From the above description it is apparent to one familiar with the art that the basic elements of the present invention may be rearranged, forming a different physical shape but still retaining its fundamental operating design described above.

What is claimed is:

1. An apparatus for indicating the presence of ferrous fasteners beneath a wall covering, the apparatus comprising:
    magnetic actuated switch means having a substantially planar wall engaging surface, first and second terminals, and which normally is in a state in which current cannot pass between the first and second terminals and which switches to a state which allows current to pass between the first and second terminals when the wall engaging surface is held near a ferrous substance, the magnetic actuated switch means comprising:
    a compartment having side walls and first and second ends, the first end being located proximate the wall engaging surface;
    a first contact connected to the first terminal, the first contact being positioned within the compartment;
    a second leaf spring contact connected to the second terminal, the second leaf spring contact being positioned within the compartment and having a free end for contacting the first contact;
    a permanent magnet arranged to permit sliding movement within the compartment, the permanent magnet, when positioned proximate the first end causing the free end of the second leaf spring contact to make electrical contact with the first contact, thereby allowing current to pass between the first and second terminals, and when positioned proximate the second end permitting the free end of the second leaf contact to assume a position spaced from the first contact thereby preventing current from passing between the first and second terminals, wherein the first contact and the second leaf spring contact are positioned between the first end and the permanent magnet; and
    ferrous metal bias means on an opposite side of the second end of the compartment from the permanent magnet, wherein magnetic attraction between the magnet and the ferrous metal bias means normally biases the permanent magnet to a position proximate the second end, and wherein magnetic attraction between the permanent magnet and a ferrous substance proximate the wall engaging surface causes the permanent magnet to slide to a position proximate the first end;
    light source means; and
    power source means conductively connected in series with the magnetic actuated switch means and the light source means whereby the light source means is energized when the substantially planar wall engaging surface is held near a ferrous substance.

2. The apparatus of claim 1 and further comprising:
    on/off switching means connected in series with the magnetic actuated switch means, the light source means, and the power source means.

3. The apparatus of claim 1 wherein the power source means comprises battery means.

4. The apparatus of claim 1 wherein the power source means comprises a battery positioned on an opposite side of the second end from the permanent magnet, and wherein the ferrous metal bias means comprises a ferrous metal case of the battery.

5. The apparatus of claim 1 wherein the second leaf spring contact is sickle shaped.

6. The apparatus of claim 5 wherein the sickle shaped second leaf spring contact is oriented at an angle with respect to the first end, so that the free end of the sickle shaped second leaf spring contact is normally spaced from the first end and the first contact.

7. The apparatus of claim 6 wherein the first contact further includes a conductive dimple on a surface of the first contact opposite the free end of the second leaf spring contact for providing point contact between the first and second contacts when the permanent magnet slides to its first position proximate the first end.

8. The apparatus of claim 7 wherein the first contact is held in position against the first end of the compartment.

9. A magnetic actuated switch having first and second terminals and having a first state in which current is allowed to pass between the first and second terminals and a second state in which current cannot pass between the first and second terminals, the magnetic actuated switch changing the second to the first state when a ferrous substance is brought in proximity to the switch, the switch comprising:
    a compartment having side walls and first and second ends;
    a first contact connected to the first terminal, the first contact being positioned within the compartment;
    a second leaf spring contact connected to the second terminal, the second leaf spring contact being positioned within the compartment and having a free end for contacting the first contact;
    a permanent magnet arranged to permit sliding movement within the compartment, the permanent magnet, when positioned proximate the first end causing the free end of the second leaf spring contact to make electrical contact with the first contact, thereby allowing current to pass between the first and second terminals, and when positioned proximate the second end permitting the free end of the second leaf spring contact to assume a position spaced from the first contact thereby preventing current from passing between the first and second terminals, wherein the first contact and the second leaf spring contact are positioned between the first end and the permanent magnet; and ferrous metal bias means for providing magnetic attraction between the magnet and the ferrous metal bias means which normally biases the permanent magnet to a position proximate one of the first and second ends, and wherein magnetic attraction between the permanent magnet and the ferrous substance proximate the switch causes the magnet to slide to a position proximate the other of the first and second ends.

10. The apparatus of claim 9 wherein the second leaf spring contact is sickle shaped.

11. The apparatus of claim 10 wherein the sickle shaped second leaf spring contact is oriented at an angle with respect to the first end, so that the free end of the sickle shaped second leaf spring contact is normally spaced from the first end and the first contact.

12. The apparatus of claim 11 wherein the first contact further includes a conductive dimple on a surface of the first contact opposite the free end of the second leaf spring contact for providing point contact between the first and second contacts when the permanent magnet is in its position proximate the first end.

13. The apparatus of claim 12 wherein the first contact is positioned against the first end of the compartment.

14. The apparatus of claim 9 wherein the ferrous metal bias means is positioned on an opposite side of the second end of the compartment from the permanent magnet, whereby magnetic attraction between the magnet and the ferrous metal bias means normally biases the permanent magnet to its position proximate the second end, and wherein magnetic attraction between the permanent magnet and a ferrous substance proximate the wall engaging surface causes the permanent magnet to slide to its position proximate the first end.

15. A magnetic actuated switch having first and second terminals and having a first state in which current is allowed to pass between the first and second terminals and a second state in which current cannot pass between the first and second terminals, the magnetic actuated switch changing the second to the first state when a ferrous substance is brought in proximity to the switch, the switch comprising:

a compartment having side walls and first and second ends;

a first contact connected to the first terminal, the first contact being positioned within the compartment adjacent the first end;

a second sickle shaped leaf spring contact connected to the second terminal, the second sickle shaped leaf spring contact being positioned within the compartment and having a free end for contacting the first contact, the sickel shaped leaf spring contact being oriented at an angle with respect to the first end of the compartment so that the free end of the sickle shaped leaf spring contact is normally spaced from the first end and the first contact;

a permanent magnet arranged to permit sliding movement within the compartment, the permanent magnet, when positioned proximate the first end causing the free end of the second sickle shaped leaf spring contact to make electrical contact with the first contact, thereby allowing current to pass between the first and second terminals, and when positioned proximate the second end permitting the free end of the second sickle shaped leaf spring contact to assume a position spaced from the first contact thereby preventing current from passing between the first and second terminals, wherein the first contact and the second sickle shaped leaf spring contact are positioned between the first end and the permanent magnet; and ferrous metal bias means for providing magnet attraction between the magnet and the ferrous metal bias means which normally biases the permanent magnet to a position proximate one of the first and second ends, and wherein magnetic attraction between the permanent magnet and the ferrous substance proximate the switch causes the magnet to slide to a position proximate the other of the first and second ends.

16. The apparatus of claim 15 wherein the first contact further includes a conductive dimple on a surface of the first contact opposite the free end of the second sickle shaped leaf spring contact for providing point contact between the first and second contacts when the permanent magnet is in its position proximate the first end of the compartment.

* * * * *